(12) United States Patent
Maeda et al.

(10) Patent No.: US 10,996,854 B2
(45) Date of Patent: *May 4, 2021

(54) DELETION OF BLOCKS IN A BLOCKCHAIN

(71) Applicant: International Business Machines Corporation, Armonk, NY (US)

(72) Inventors: Kumiko Maeda, Tokyo (JP); Munetaka Ohtani, Fujisawa (JP); Yutaka Oishi, Kawasaki (JP); Chikafumi Yasumoto, Tokyo (JP); Jiayun Zhu, Edogawa-ku (JP)

(73) Assignee: International Business Machines Corporation, Armonk, NY (US)

( * ) Notice: Subject to any disclaimer, the term of this patent is extended or adjusted under 35 U.S.C. 154(b) by 105 days.

This patent is subject to a terminal disclaimer.

(21) Appl. No.: 16/411,140

(22) Filed: May 14, 2019

(65) Prior Publication Data

US 2019/0265894 A1 Aug. 29, 2019

Related U.S. Application Data

(63) Continuation of application No. 15/817,908, filed on Nov. 20, 2017, now Pat. No. 10,739,997.

(51) Int. Cl.
*G06F 3/06* (2006.01)
*G06F 16/22* (2019.01)
(Continued)

(52) U.S. Cl.
CPC ............ *G06F 3/0608* (2013.01); *G06F 3/067* (2013.01); *G06F 3/068* (2013.01); *G06F 3/0619* (2013.01);
(Continued)

(58) Field of Classification Search
CPC ............... G06F 3/0608; G06F 16/2255; G06F 16/2322; G06F 3/0641; G06F 3/067;
(Continued)

(56) References Cited

U.S. PATENT DOCUMENTS 10,305,833 B1 * 5/2019 Dennis .................... H04L 67/10
10,389,518 B2 * 8/2019 Chen ..................... H04L 9/3236
(Continued)

FOREIGN PATENT DOCUMENTS

WO 2017006134 A1 1/2017

OTHER PUBLICATIONS

Bruce, J.D., "The Mini-Blockchain Scheme", www.cryptonite.info, Mar. 2017.
(Continued)

*Primary Examiner* — Robert W Beausoliel, Jr.
*Assistant Examiner* — Mohammad Solaiman Bhuyan
(74) *Attorney, Agent, or Firm* — North Shore Patents, P.C.; Michele Liu Baillie

(57) ABSTRACT

In a mechanism for deleting blocks from a blockchain, a retention period (T), a minimum number of blocks (L), and a hash of the oldest block are defined. A participant node creates the new block including a block header. The participant node determines whether a timestamp in an oldest block in the blockchain is older than a current time plus T, and whether a current number of blocks in the blockchain is greater than or equal to L. When both are true, the participant node deletes an oldest block in the blockchain. The participant node adds a hash of an oldest remaining block and an original number of blocks of the blockchain to the block header of the new block. The participant node broadcasts a message announcing the new block to remaining participant nodes of the plurality of participant nodes.

6 Claims, 4 Drawing Sheets

(51) Int. Cl.
  *G06F 16/23* (2019.01)
  *H04L 12/26* (2006.01)
  *H04L 12/18* (2006.01)

(52) U.S. Cl.
  CPC ........ *G06F 3/0641* (2013.01); *G06F 16/2255* (2019.01); *G06F 16/2322* (2019.01); *H04L 43/106* (2013.01); *H04L 12/18* (2013.01); *H04L 12/1881* (2013.01)

(58) Field of Classification Search
  CPC ..... G06F 3/068; G06F 3/0619; H04L 43/106; H04L 12/1881; H04L 12/18
  See application file for complete search history.

(56) References Cited

U.S. PATENT DOCUMENTS

2018/0189312 A1* 7/2018 Alas ................. G06F 21/64
2018/0189755 A1* 7/2018 Kilpatrick ............... G06F 21/64

OTHER PUBLICATIONS

Dennis, R., et. al.; "A Temporal Blockchain: A Formal Analysis", 2016 International Conference on Collaboration Technologies and Systems (CTS); Orlando, Florida, US; Oct. 2016.
Nakamoto, S., et. al.; "Bitcoin: A Peer-to-Peer Electronic Cash System"; www.bitcoin.org; 2008.
List of IBM Patents or Applications Treated as Related dated May 6, 2020.

* cited by examiner

DELETION OF BLOCKS IN A BLOCKCHAIN

BACKGROUND

A blockchain is a continuously growing list of records, or blocks, which are linked through a hash pointer at each block which points to a previous block. This linking of the blocks allows the confirmation of the integrity of the previous block, and iteratively, all the way back to the original block. Each block further includes a timestamp and transaction data. Various timestamping schemes can be used to serialize changes to the blockchain. The design of a blockchain is inherently resistant to modification of the data in the blocks. A blockchain may serve as a distributed transaction ledger that is used to record transactions across many computers or nodes so that the record cannot be altered retroactively without altering all subsequent blocks, which requires the collusion of the network. As a distributed transaction ledger, a blockchain is typically managed by a peer-to-peer network where the nodes collectively adhere to a protocol for validating or verifying new blocks added to the blockchain. Blockchains are suitable for the recording of events, medical records, and other types of activities. However, conventional blockchains do not include a mechanism for deleting blocks, resulting in the inconvenience in data management and in an ever increasing need for storage.

SUMMARY

Disclosed herein is a method for deleting a block from a blockchain, and a computer program product and system as specified in the independent claims. Embodiments of the present invention are given in the dependent claims. Embodiments of the present invention can be freely combined with each other if they are not mutually exclusive.

According to an embodiment of the present invention, in a method for deleting a block from a blockchain, where the blockchain maintained by a plurality of participant nodes in a network, a participant node of the plurality of participant nodes calculates a proof of work for a new block to be added to the blockchain. The participant node creates the new block including a block header. The participant node determines whether a timestamp in an oldest block in the blockchain is older than a current time plus a pre-configured retention period, and whether a current number of blocks in the blockchain is greater than or equal to a pre-configured minimum number of blocks to be maintained in the blockchain. When the timestamp in the oldest block in the blockchain is older than the current time plus the pre-configured retention period, and when the current number of blocks in the blockchain is greater than or equal to the pre-configured minimum number of blocks to be maintained in the blockchain, the participant node deletes the oldest block in the blockchain. The participant node adds a hash of an oldest remaining block and an original number of blocks of the blockchain to the block header of the new block. The participant node broadcasts a message announcing the new block to remaining participant nodes of the plurality of participant nodes.

According to another embodiment of the present invention, when a second participant node of the plurality of participant nodes receives the new block, the second participant node performs a verification of the new block. When the verification of the new block fails, the new block is rejected by the second participant node. When the verification of the new block passes, the second participant node determines whether a hash of a previous block in the new block is consistent with the original number of blocks in the new block. When inconsistent, the new block is rejected by the second participant node.

When the hash of the previous block in the new block is consistent with the original number of blocks in the new block, the second participant node compares the hash of the oldest remaining block in the new block with a hash of an oldest block in a latest block in the blockchain. When they do not match, the second participant node deletes the oldest block in the blockchain.

When the hash of the oldest remaining block in the new block matches the hash of the oldest block in the latest block in the blockchain, the second participant node determines whether a current number of blocks of the blockchain is greater than or equal to the pre-configured minimum number of blocks to be maintained in the blockchain. When the current number of blocks of the blockchain is not greater than or equal to the pre-configured minimum number of blocks to be maintained in the blockchain, the second participant node rejects the new block.

When the current number of blocks of the blockchain is greater than or equal to the pre-configured minimum number of blocks to be maintained in the blockchain, the second participant node determines whether the original number of blocks of the blockchain in the new block is greater than the current number of blocks in the blockchain. When the original number of blocks of the blockchain in the new block is not greater than the current number of blocks in the blockchain, the new block is rejected by the second participant node. When the original number of blocks of the blockchain in the new block is greater than the current number of blocks in the blockchain, the new block is accepted by the second participant node.

DETAILED DESCRIPTION

Embodiments of the present invention provide a mechanism for deleting blocks from a blockchain. The embodiments define a retention period (T), a minimum number of blocks required of the blockchain (L), and a hash of the oldest block in the longest branch of the blockchain stored in the latest block added to the blockchain. When T, L, and the hash of the oldest block are used as described herein, blocks may be deleted from a blockchain while maintaining the tamperproof nature of the blockchain.

Figure 1:
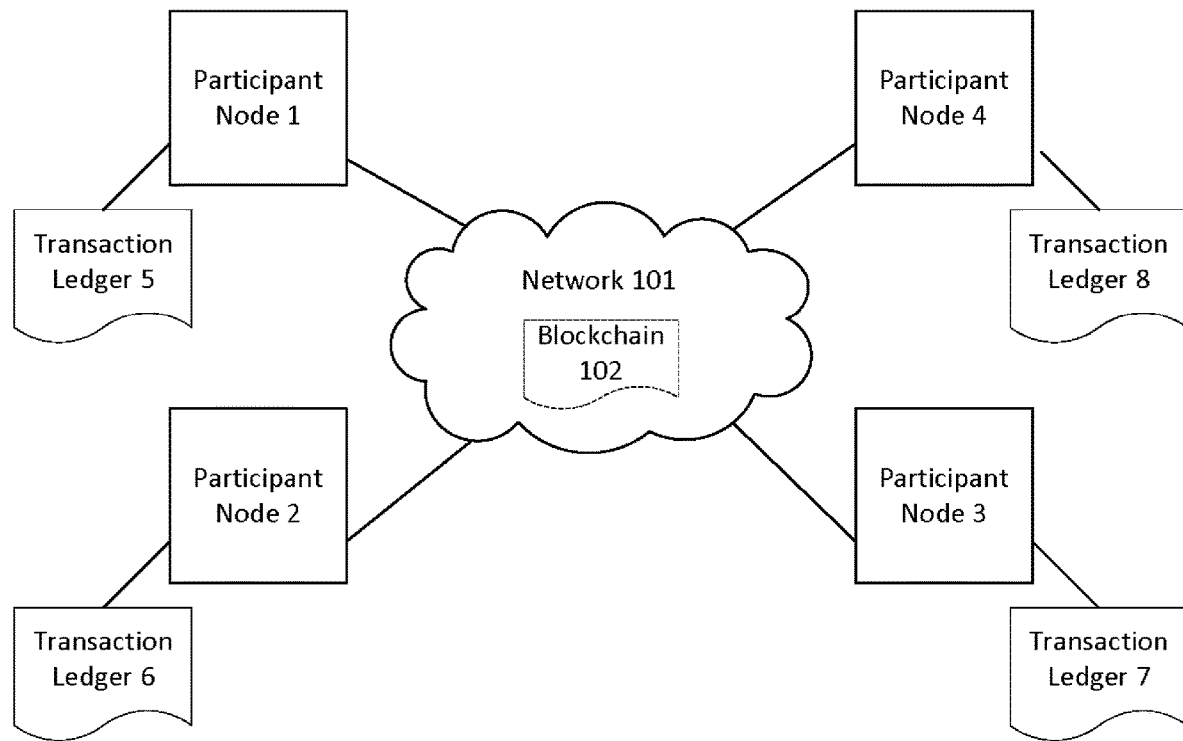
FIG. 1 illustrates a configuration of nodes participating in a blockchain according to embodiments of the present invention.

FIG. 1 illustrates a configuration of nodes participating in a blockchain according to embodiments of the present invention. The network 101 manages a blockchain 102 and includes a plurality of participant nodes 1-4. Each participant node 1-4 maintains a transaction ledger 5-8 of the blockchain 102. No centralized copy of the blockchain 102 exists and no participant node 1-4 is more trusted than any other. When a participant node 1 creates a new block, the participant node 1 broadcasts a message announcing the new block to the other participant nodes 2-4 in the network 101. The other participant nodes 204 can respond by requesting the header of the new block or a copy of the new block itself. Each participant node 1-4 validates the blocks it receives from another participant node. A retention period (T) and a minimum number of blocks (L) to be maintained are defined for the blockchain 102. The T may be configured in accordance with a requirement of an application using the blockchain 102. For example, T may be defined as five years in accordance with certain laws and regulations. The L may be configured based on a calculation pace of proof of work and the number of participant nodes. For example, L can be defined as the total number of blocks that 30% of participant nodes can create over a one-year period. In an alternative embodiment, when an environment meets a certain reliability threshold, L need not be defined or can be set to null. Embodiments of the present invention applies T, L, and the hash of the oldest block to the longest branch of the blockchain 102.

Figure 2:
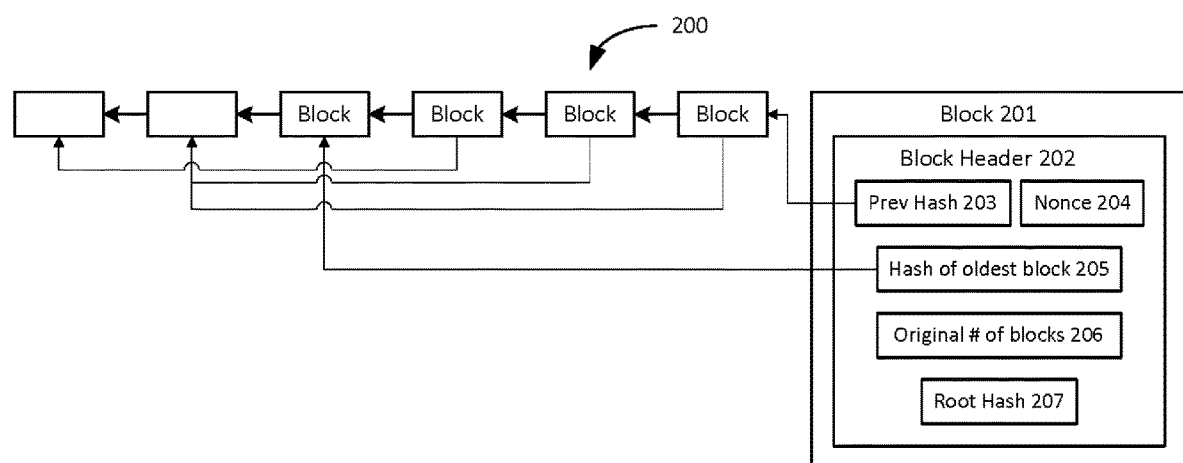
FIG. 2 illustrates a block structure according to embodiments of the present invention.

FIG. 2 illustrates a block structure according to embodiments of the present invention. A plurality of blocks 200 of the blockchain 102 are shown. For each block in the blockchain 102, the block header 202 includes a hash of a previous block 203, a nonce 204, and a root hash 207. The hash of the previous block points to the previous block thus creating the chain. The nonce is incremented each time a hash is tried. The root hash 207 is a hash of all transactions in the block 201. Embodiments of the present invention additionally stores in the block header 202 a hash of the oldest block 205 to be retained and an original number of blocks 206 in the blockchain 102.

Figure 3:
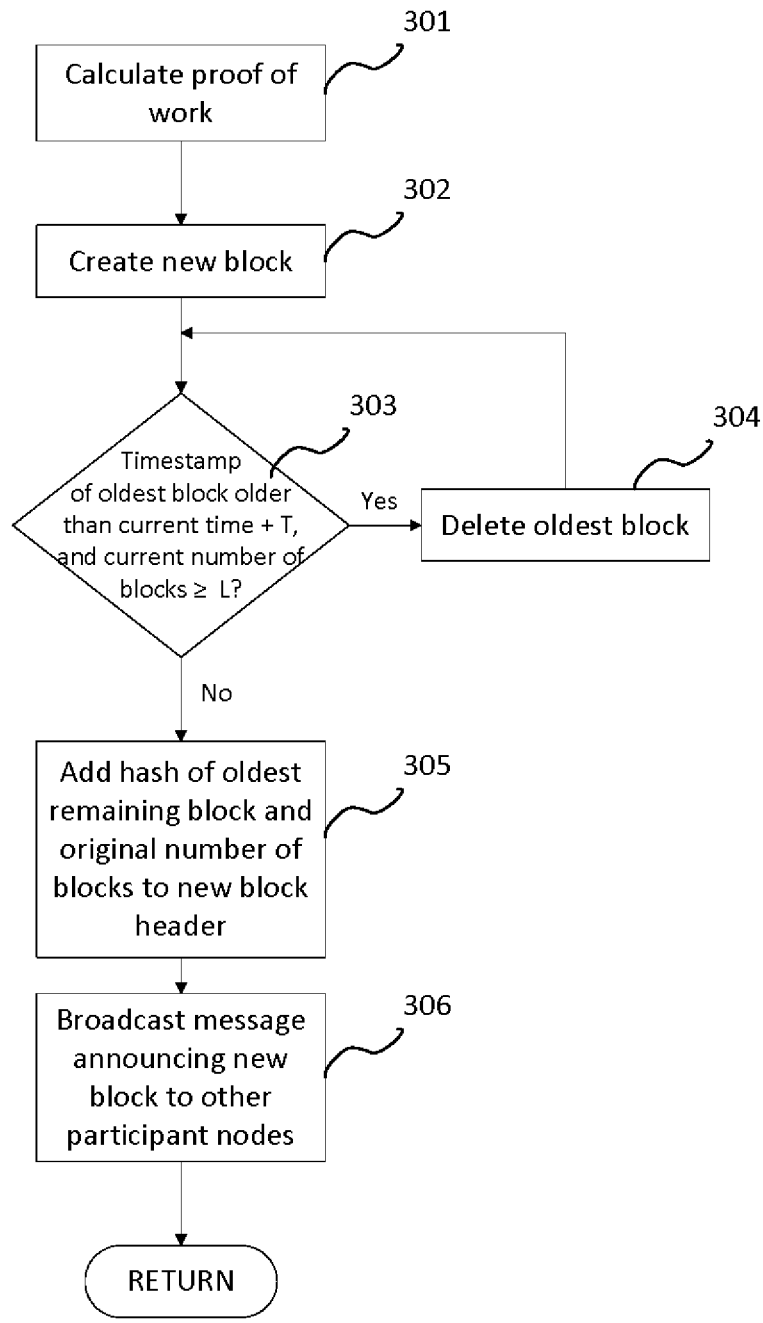
FIG. 3 illustrates the creating of a new block by a participant node according to embodiments of the present invention.

FIG. 3 illustrates the creating of a new block by a participant node according to embodiments of the present invention. Assume that participant node 1 creates a new block with the block structure 201 illustrated in FIG. 2. The participant node 1 calculates a proof of work (301). According to the rules in the original blockchain, the participant nodes 1-4 cannot add a new block without the proof of work. The new block 201 is then created (302), with the hash of the previous block 203, the nonce 204, and the root hash 207 in the block header 202. The participant node 1 determines whether a timestamp of the oldest block of the blockchain 102 is older than the current time plus T, and determines whether the current number of blocks in the blockchain 102 is greater than or equal to L (303). If the timestamp of the oldest block is older than the current time plus T and the current number of blocks is greater than or equal to L, then the oldest block can be deleted from the blockchain 102 while maintaining the integrity of the blockchain 102. Participant node 1 thus deletes the oldest block from the blockchain 102 (304). Otherwise, no block is deleted. The participant node 1 adds the hash of the oldest remaining block 205 and the original number of blocks 206 to the new block header 202 (305). When the oldest block has been deleted, the oldest remaining block is the oldest block in the blockchain after the deletion. When no block is deleted, the oldest remaining block is the same as the oldest block in the blockchain. Once the new block 201 is created and added to its copy of the transaction ledger 5, the participant node 1 broadcasts a message announcing the new block 201 to the other participant nodes 2-4 in the network 101 (306). The other participant nodes 2-4 may respond with a request either for the header of the new block or a copy of the new block itself.

Figure 4:
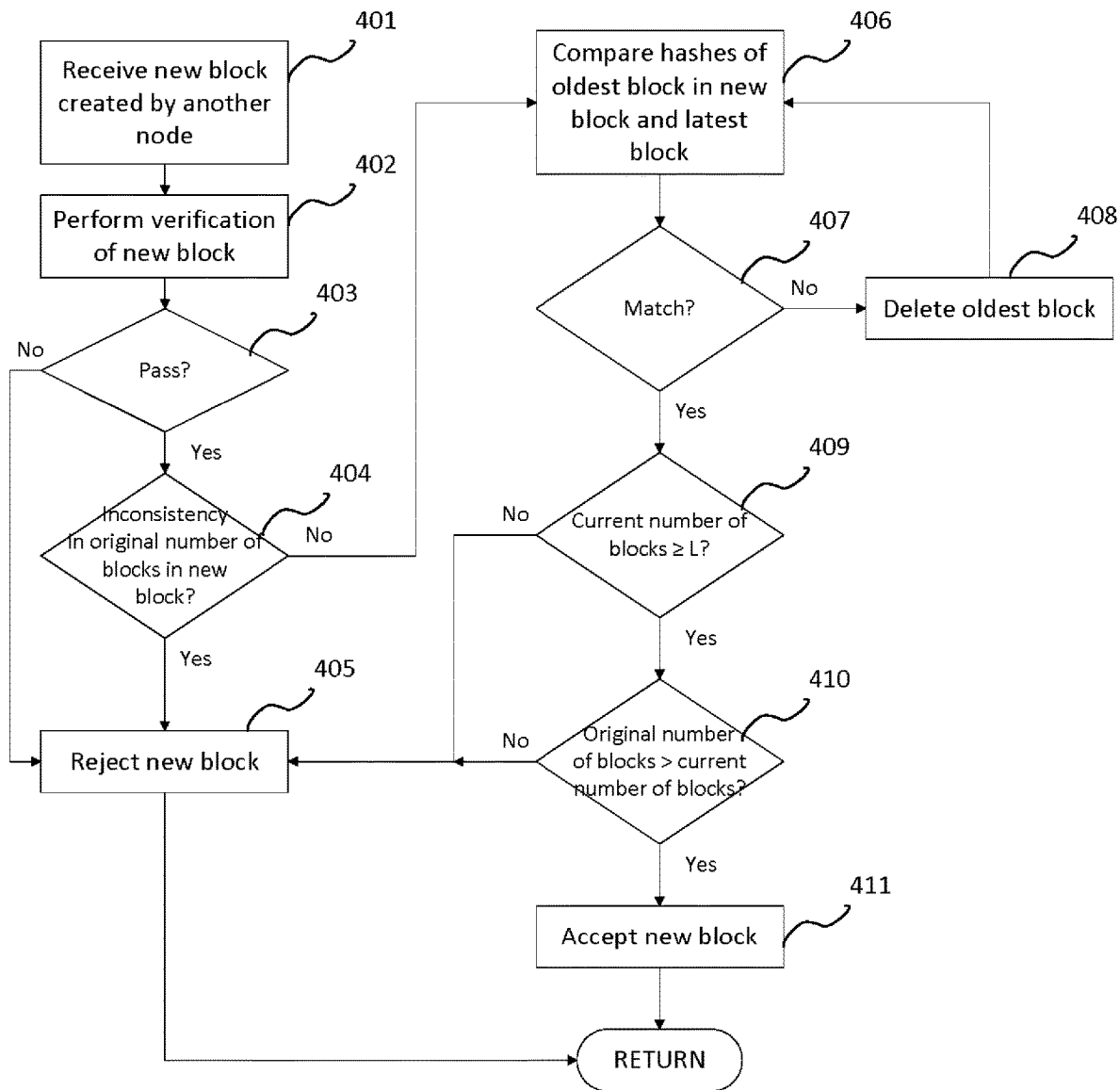
FIG. 4 illustrates the addition, by a participant node, of a new block created by another participant node in the network, according to embodiments of the present invention.

FIG. 4 illustrates the addition, by a participant node, of a new block created by another participant node in the network, according to embodiments of the present invention. Assume that participant node 2 receives the new block 201 created by participant node 1 (401). Participant node 2 performs verification of the new block 201 (402) by hashing all transactions in the new block 201 and comparing this hash with the root hash 207 in the new block header 202. If the verification of the new block 201 fails (403), then the participant node 2 rejects the new block 201 (405). If the verification of the new block 201 succeeds (403), then the participant node 2 proceeds and determines whether the original number of blocks 206 is inconsistent with the hash of the previous block 203 (404). The original number of blocks 206, i.e., the original length of the blockchain 102, should be incremented by one with each block added to the blockchain 102. When incremented properly, the original number of blocks 206 matches the hash of the previous block 203. When there is a mismatch between the original number of blocks 206 and the hash of the previous block 203, this inconsistency indicates the possibility of tampering. Thus, when there is an inconsistency, the participant node 2 rejects the new block 201 (405).

When the original number of blocks 206 is consistent with the hash of the previous block (404), the participant node 2 proceeds with the comparison of the hashes of the oldest block 205 in the new block 201 and in the oldest block in the latest block (406). The latest block is the last block added to the blockchain 102 prior to the new block 201 and has the same block structure illustrated in FIG. 2. When the hashes of the oldest block 205 in the new block 201 and in the latest block do not match, then the block pointed to by the hash of the oldest block in the latest block is older than the block pointed to by the hash of the oldest block in the new block 201. The oldest block, pointed to by the hash of the oldest block in the latest block, is deleted by the participant node 2 (408). Otherwise, the participant node 2 proceeds by determining whether the current number of blocks in the blockchain 102 is greater than or equal to L (409). If the current number of blocks is less than L, then this indicates the possibility of tampering, and the participant node 2 rejects the new block 201 (405). Otherwise, the participant node 2 determines whether the original number of blocks 206 is greater than the current number of blocks (410). The original number of blocks 206 of the blockchain 102 should be incremented by one with each block added to the blockchain 102. When incremented properly, the original number of blocks 206 is greater than the current number of blocks. If the original number of blocks 206 is not greater than the current number of blocks, then this indicates the possibility of tampering, and the participant node 2 rejects the new block 201 (405). Otherwise, the participant node 2 accepts the new block (411), and adds the new block to its copy of the blockchain 102.

Figure 5:
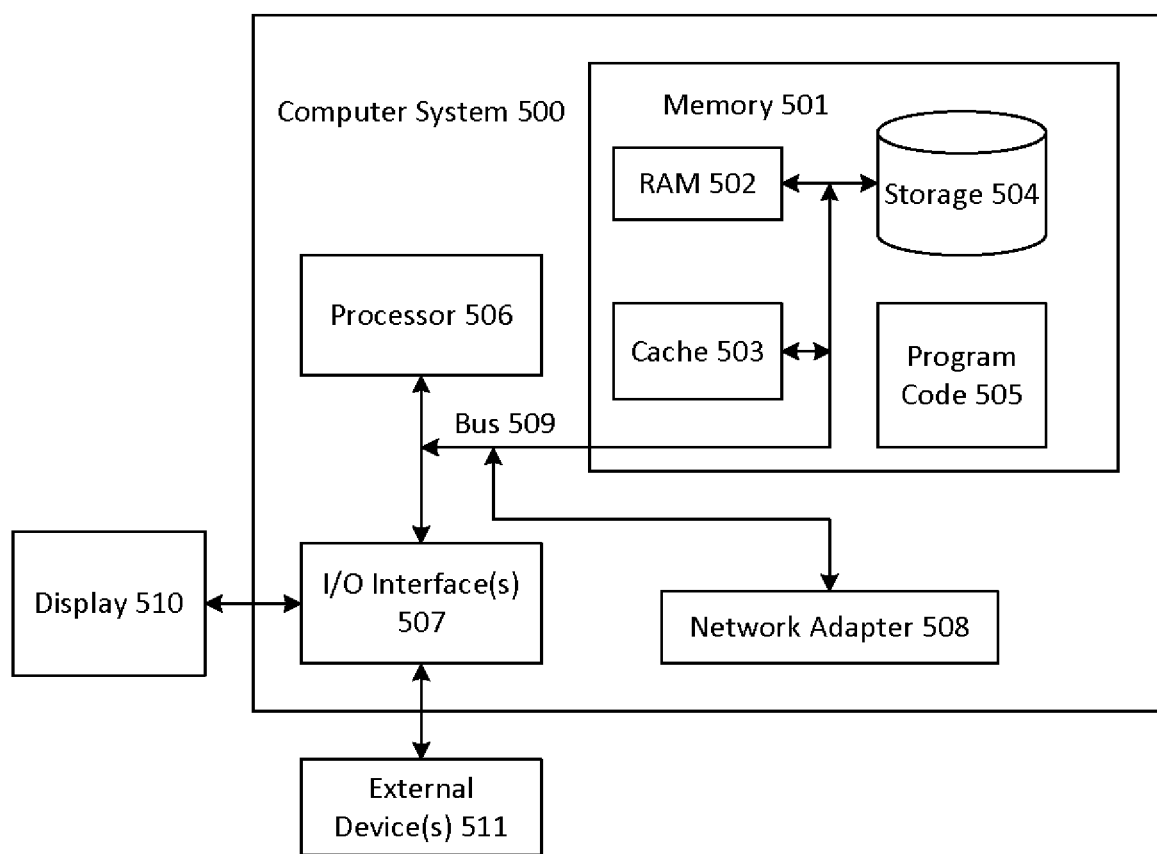
FIG. 5 illustrates a computer system, one or more of which implements embodiments of the present invention.

FIG. 5 illustrates a computer system, one or more of which implements embodiments of the present invention. The computer system 500 is operationally coupled to a processor or processing units 506, a memory 501, and a bus 509 that couples various system components, including the memory 501 to the processor 506. The bus 509 represents one or more of any of several types of bus structure, including a memory bus or memory controller, a peripheral bus, an accelerated graphics port, and a processor or local bus using any of a variety of bus architectures. The memory 501 may include computer readable media in the form of volatile memory, such as random access memory (RAM) 502 or cache memory 503, or non-volatile storage media 504. The memory 501 may include at least one program product having a set of at least one program code module 505 that are configured to carry out the functions of embodiment of the present invention when executed by the processor 506. The computer system 500 may also communicate with one or more external devices 511, such as a display 510, via I/O interfaces 507. The computer system 500 may communicate with one or more networks via network adapter 508.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for deleting a block from a blockchain, the blockchain maintained by a plurality of participant nodes in a network, comprising:
   calculating, by a first participant node of the plurality of participant nodes, a proof of work for a new block to be added to a first copy of the blockchain at the first participant node;
   creating, by the first participant node, the new block comprising a first block header;
   determining, by the first participant node, whether a timestamp in an oldest block in the first copy of blockchain is older than a current time plus a pre-configured retention period, and whether a current number of blocks in the first copy of the blockchain is greater than or equal to a pre-configured minimum number of blocks to be maintained in the blockchain;
   when the timestamp in the oldest block in the first copy of the blockchain is older than the current time plus the pre-configured retention period, and when the current number of blocks in the first copy of the blockchain is greater than or equal to the pre-configured minimum number of blocks to be maintained in the blockchain, perform a deletion, by the first participant node, of the oldest block in the first copy of the blockchain;
   incrementing, by the first participant node, an original number of blocks of the blockchain;
   adding, by the first participant node, the incremented original number of blocks and a first hash of a first oldest remaining block to the first block header of the new block, the first oldest remaining block being an oldest block in the first copy of the blockchain after the deletion;
   broadcasting, by the first participant node, a message announcing the new block to remaining participant nodes of the plurality of participant nodes;
   receiving, by a second participant node of the remaining participant nodes, the message from the first participant node, wherein a second copy of the blockchain at the second participant node comprises alatest block, the latest block being alast block added to the second copy of the blockchain prior to the new block, the latest block having a second block header comprising a second hash of a second oldest remaining block, the second oldest remaining block being an oldest block in the second copy of the blockchain;
   comparing, by the second participant node, the first hash with the second hash; and
   when the first hash does not match the second hash, deleting, by the second participant node, the second oldest remaining block pointed to by the second hash.

2. The method of claim 1, further comprising:
   performing, by the second participant node, a verification of the new block;
   when the verification of the new block fails, rejecting the new block by the second participant node;
   when the verification of the new block passes, determining whether a hash of a previous block in the new block is consistent with the incremented original number of blocks in the new block; and
   when the hash of the previous block in the new block is inconsistent with the incremented original number of blocks in the new block, rejecting the new block by the second participant node.

3. The method of claim 1, further comprising:
   when the first hash matches the second hash, determining, by the second participant node, whether a current number of blocks of the second copy of the blockchain is greater than or equal to the pre-configured minimum number of blocks to be maintained in the blockchain; and
   when the current number of blocks of the second copy of the blockchain is not greater than or equal to the pre-configured minimum number of blocks to be maintained in the blockchain, rejecting the new block by the second participant node.

4. The method of claim 3, further comprising:
   when the current number of blocks of the second copy of the blockchain is greater than or equal to the pre-configured minimum number of blocks to be maintained in the blockchain, determining, by the second participant node, whether the incremented original number of blocks in the new block is greater than the current number of blocks in the second copy of the blockchain;
   when the incremented original number of blocks in the new block is not greater than the current number of blocks in the second copy of the blockchain, rejecting the new block by the second participant node; and
   when the incremented original number of blocks in the new block is greater than the current number of blocks in the second copy of the blockchain, accepting the new block by the second participant node.

5. The method of claim 1, wherein the pre-configured retention period is determined based on requirements of an application using the blockchain.

6. The method of claim 1, wherein the pre-configured minimum number of blocks to be maintained in the blockchain is determined based on a calculation pace of the proof of work and a number of the plurality of participant nodes.

* * * * *